US010366132B2

(12) United States Patent
Jiron et al.

(10) Patent No.: US 10,366,132 B2
(45) Date of Patent: Jul. 30, 2019

(54) DELIVERING CUSTOMIZED CONTENT USING A FIRST PARTY PORTAL SERVICE

(71) Applicant: Sony Interactive Entertainment LLC, San Mateo, CA (US)

(72) Inventors: Joey Jiron, San Francisco, CA (US); Peng Zhang, Richmond, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 89 days.

(21) Appl. No.: 15/392,237

(22) Filed: Dec. 28, 2016

(65) Prior Publication Data
US 2018/0181661 A1    Jun. 28, 2018

(51) Int. Cl.
G06F 16/00    (2019.01)
G06F 16/9535    (2019.01)
H04L 29/08    (2006.01)

(52) U.S. Cl.
CPC .......... *G06F 16/9535* (2019.01); *H04L 67/22* (2013.01); *H04L 67/2804* (2013.01); *H04L 67/327* (2013.01)

(58) Field of Classification Search
CPC .............. G06F 17/30; G06F 17/30867; G06F 16/9535; H04L 67/22; H04L 67/2804; H04L 67/327
USPC ....................................................... 707/723
See application file for complete search history.

(56) References Cited

U.S. PATENT DOCUMENTS

| 7,483,871 | B2 * | 1/2009 | Herz ................. G06F 17/30867 707/999.002 |
| 9,094,738 | B2 | 7/2015 | Kishore |
| 9,098,572 | B1 * | 8/2015 | Reilly .............. G06F 17/30867 |
| 9,418,388 | B1 | 8/2016 | Young |
| 9,569,624 | B1 | 2/2017 | Nijim et al. |
| 9,715,901 | B1 | 7/2017 | Singh et al. |

(Continued)

FOREIGN PATENT DOCUMENTS

| WO | WO 2018/118267 | 6/2018 |
| WO | WO 2018/125392 | 7/2018 |
| WO | WO 2018/128713 | 7/2018 |

OTHER PUBLICATIONS

PCT Application No. PCT/US2017/061149 International Search Report and Written Opinion dated Feb. 1, 2018.

(Continued)

*Primary Examiner* — Vincent F Boccio
(74) *Attorney, Agent, or Firm* — Polsinelli LLP (57) ABSTRACT

The systems and methods are directed towards a first party portal service that facilitates providing customized content for each user to view. In particular, a list of customized content would correspond to content (e.g., videos, programs, movies) that users would more likely view and find interesting or enjoyable. This customization can be influenced, for example, based on user preference (i.e. what types of shows users enjoy watching, genre, actors) and user viewing history (i.e. what shows the user has watched). The customized content would be displayed on a user device associated with the first party portal service. The user would then be able to view content via the user device. Furthermore, the customized content that is provided to each user can be dynamically updated based on various conditions.

20 Claims, 3 Drawing Sheets

(56) References Cited

U.S. PATENT DOCUMENTS

| | | | |
|---|---|---|---|
| 2002/0040374 A1* | 4/2002 | Kent | G06Q 30/02 |
| | | | 715/210 |
| 2004/0059705 A1* | 3/2004 | Wittke | G06N 5/00 |
| | | | 707/999.001 |
| 2005/0033657 A1* | 2/2005 | Herrington | G06F 17/30058 |
| | | | 705/26.7 |
| 2005/0071328 A1* | 3/2005 | Lawrence | G06F 17/30867 |
| | | | 707/999.003 |
| 2007/0130602 A1 | 6/2007 | Gulli et al. | |
| 2007/0143493 A1 | 6/2007 | Mullig et al. | |
| 2007/0157234 A1 | 7/2007 | Walker | |
| 2009/0150784 A1 | 6/2009 | Denney et al. | |
| 2009/0228774 A1* | 9/2009 | Matheny | G06F 17/30873 |
| | | | 715/201 |
| 2009/0249244 A1 | 10/2009 | Robinson et al. | |
| 2010/0123830 A1 | 5/2010 | Vunic | |
| 2010/0153848 A1 | 6/2010 | Saha | |
| 2011/0022549 A1 | 1/2011 | Zhuang et al. | |
| 2011/0107382 A1* | 5/2011 | Morris | H04N 7/17318 |
| | | | 725/109 |
| 2012/0191692 A1 | 7/2012 | Wang | |
| 2013/0080895 A1 | 3/2013 | Rossman et al. | |
| 2013/0086159 A1* | 4/2013 | Gharachorloo | G06F 17/30038 |
| | | | 709/204 |
| 2013/0097159 A1* | 4/2013 | Park | G06Q 30/02 |
| | | | 707/723 |
| 2013/0117781 A1 | 5/2013 | Kim et al. | |
| 2016/0070962 A1 | 3/2016 | Shetty et al. | |
| 2016/0105734 A1 | 4/2016 | Packard et al. | |
| 2016/0140227 A1 | 5/2016 | Lymberopoulos et al. | |
| 2016/0381111 A1 | 12/2016 | Barnett et al. | |
| 2018/0018972 A1 | 1/2018 | Ensor et al. | |
| 2018/0132011 A1 | 5/2018 | Shichman et al. | |
| 2018/0176612 A1 | 6/2018 | Neufeld | |
| 2018/0199102 A1 | 7/2018 | Gross | |

OTHER PUBLICATIONS

PCT Application No. PCT/US2017/061185 International Search Report and Written Opinion dated Feb. 1, 2018.
PCT Application No. PCT/US2017/061189 International Search Report and Written Opinion dated Jan. 30, 2018.
U.S. Appl. No. 15/400,944 Office Action dated Jan. 26, 2018.
PCT/US17/61185, Network-Based Previews, Nov. 10, 2017.
PCT/US17/61189, Delivery of Third Party Content on a First Party Portal, Nov. 10, 2017.
PCT/US17/61149, Delivering Customized Content Using a First Party Portal Service, Nov. 10, 2017.
U.S. Appl. No. 15/400,944, filed Jan. 6, 2017, Michael Gross, Network-Based Previews.
U.S. Appl. No. 15/383,234, filed Dec. 19, 2016, Travis J. Neufeld, Delivery of Third Party Content on a First Party Portal.
U.S. Appl. No. 15/383,234 Office Action dated Mar. 20, 2018.
U.S. Appl. No. 15/383,234 Final Office Action dated Nov. 9, 2018.
U.S. Appl. No. 15/400,944 Office Action dated Dec. 31, 2018.
U.S. Appl. No. 15/400,944 Final Office Action dated Jan. 26, 2018.
U.S. Appl. No. 15/383,234 Office Action dated Apr. 25, 2019.

* cited by examiner

DELIVERING CUSTOMIZED CONTENT USING A FIRST PARTY PORTAL SERVICE

BACKGROUND

Field of Invention

The present invention generally relates to customized content. More specifically, the present invention relates to customized content using a first party portal.

Description of the Related Art

Before the age of digital media using websites and services such as Netflix and Hulu, finding content that is interesting for a user can be both time consuming and daunting. For example, a guide (i.e. television guide) may provide a list of available programs to view and what times those programs are aired. These guides may provide a short summary/excerpt regarding what that program may be about. Alternatively, users may receive suggestions as to what programs may be interesting by word of mouth from others (e.g., friends, family).

The problem with the previous way of searching for content that the user would like to view is manifold. First, users would need to initially view the content in order to determine whether or not the program is in fact interesting. The description of programs (as listed in the guide or described by others) may not be completely accurate or may not be available for the user to view. For example, if a user's friend suggests a particular show without much details (or selectively provides an aspect of the show), the user when viewing the show may find it completely different from expectation (i.e. as initially described) and uninteresting. Furthermore, even when users do find programs of interest, there are no efficient or easy ways of finding other related content that the user would also be interested in or keep track of when new related content becomes available for the user to view.

With the advent of various streaming media and video on demand services (e.g., Hulu, Youtube, Twitch), features that facilitate providing content to the user have been implemented. In particular, these services may be capable of suggesting numerous different types of content (e.g., streaming media, movies, programs) for the user to view based on various different types of criteria (e.g., personal preference, watch history). These features have been helpful in allowing users to find content that the user would be interested in from a growing supply of content available.

Even with these features implemented by various streaming media and video on demand services (e.g., Youtube), similar challenges of providing relevant content that the user would be interested in viewing still exist. The amount of viewable content is increasing substantially over time. This increase so much so that users who have a wide array of interests and extended watch history may correspondingly have a large number of suggestions for content that the existing services would suggest. There exists now a challenge of wading through an increasing number of available content that may all be deemed interesting for the user to view. There is a further need to provide a dynamic process that focuses on newer content or related content based on what the user recently viewed so as to further narrow the provided suggestions to a more manageable selection.

SUMMARY OF THE CLAIMED INVENTION

A method for displaying user specific content lists on a user computing device is presently claimed. Once a user request for a customized list of content is received at the user computing device, retrieval of all content can be performed. Information from all the retrieved content can be extracted that will subsequently be used to filter and rank applicable content. Once all applicable content have been ranked, the list can be displayed for the user to view on the computing device. The method further uses weights to modify the ranking of the content using various conditions and factors such as user preference, viewing history and other customizable provided to the user.

A system for displaying user specific content lists is also presently claimed. The system includes a user computing device (i.e. client device) that receives user request for a list of content that the user would like to view. The user computing device would subsequently display a ranked list of content based on the user request. The system would also include a first party portal service that retrieves all content for ranking. The first party portal service also extracts information from the retrieved content used to filter and rank applicable content. Once the applicable content has been ranked, the first party portal service can transmit the ranked list to the user computing device for display to the user.

A non-transitory computer-readable storage medium for displaying user specific content lists is also presently claimed. Once a user request for a customized list of content is received, retrieval of all content can be performed. Information from all the retrieved content can be extracted that will subsequently be used to filter and rank applicable content. Once all applicable content have been ranked, the list can be displayed for the user to view on the computing device. The non-transitory computer-readable storage medium also uses weights to modify the ranking of the content using various conditions and factors such as user preference, viewing history and other customizable provided to the user.

DETAILED DESCRIPTION

The present disclosure describes embodiments whereby a first party portal service provides customized content for each user to view on their respective client devices. In particular, the customized content provided by the first party portal would correspond to content (e.g., videos, programs, movies) that users would more likely view and find interesting or enjoyable. This customization can be influenced, for example, based on user preference (i.e. what types of shows users enjoy watching, genre, actors) and user viewing history (i.e. what shows the user has watched). The customized content would be displayed on a user device (i.e. client device) associated with the first party portal service. The user would then be able to view content via the user device. Furthermore, the customized content that is provided to each user can be dynamically updated based on various conditions (e.g., as new content becomes available, user preferences changes).

Figure 1:
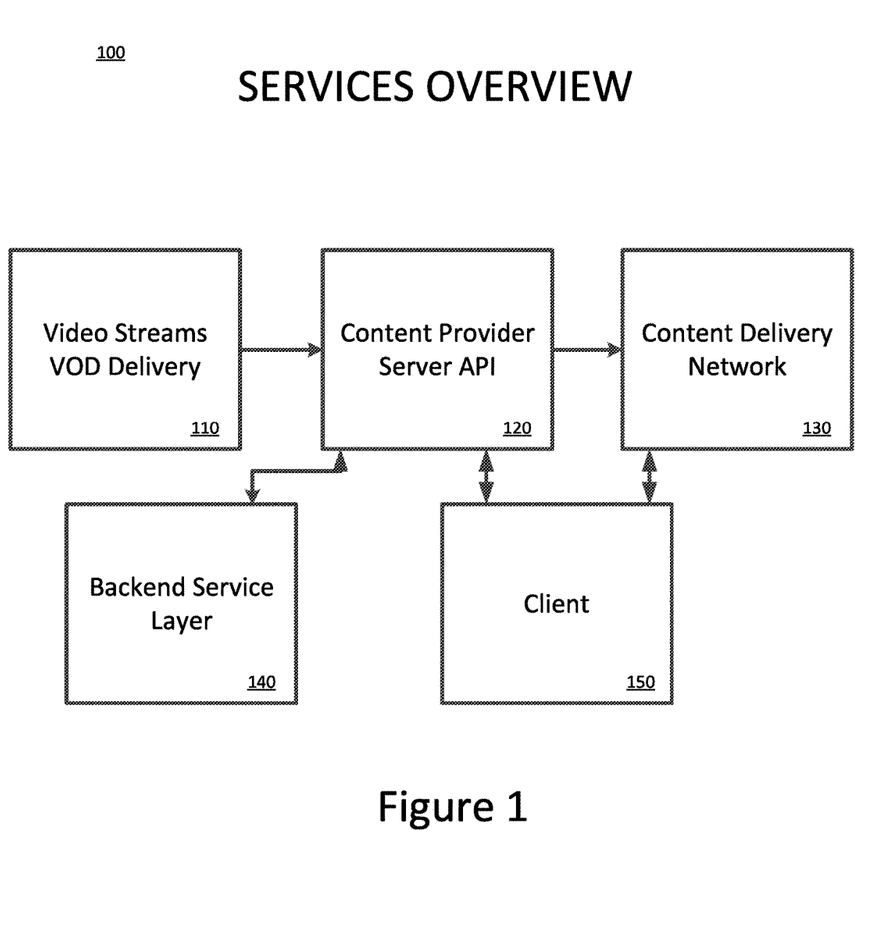
FIG. 1 is an exemplary first party portal service that provides customized content to a user.

FIG. 1 is an exemplary first party portal service 100 that provides customized content to a user. As illustrated in the figure, the first party portal service 100 includes a plurality of different elements that collectively work together in order to provide customized content for each user on their respective client device (i.e. user device) 150.

The first party portal service 100 can obtain video content from a variety of different video content sources 110. For example, the first party portal service 100 can access existing streaming media and/or video on demand (e.g., movies, television shows, online shows). In some embodiments, the first party portal service 100 can also access third party video content from various third party content providers (e.g., Twitch, Youtube, Vine).

A Content Provider Server API (Application Program Interface) 120 provides instructions usable by the client device 150 associated with the first party platform service regarding how to access content (e.g., streaming media, video on demand, third party content) from the different video content sources 110. The Content Provider Server API 120 may be provided by each of the one or more content providers 110. The Content Provider Server API 120 facilitates access, by each of the client devices 150, to the content hosted by the content providers 120. This may mean that with each unique source of content 120 there may be a unique set of instructions used to facilitate the client device 150 in accessing the content hosted by that content source 110. There may be embodiments where Content Provider Server APIs 120 are shared between two or more sources of content 110 in situations where requirements for access of the content by the client device 150 are similar.

As described below, the Content Provider Server API 120 can allow the client device 150 to access additional information about the content. Such additional information may include metadata (e.g., author, title, genre) describing the available content. The additional information may also include a location where the content is stored (e.g., URL) so that the user device can proceed with retrieving the content from the content source 110. The Content Provider Server API 120 can also include instructions for implementing features such as a chat interface that would allow different users simultaneously viewing the same content to interact with each other in real time.

The Content Provider Server API 120 can be accessed by a Content Delivery Network 130. The Content Delivery Network 130 include a server that provides static resources used by the first party portal service 100. For example, static resources may include various files that are usable by the first party portal service 100 in order to provide information to the client device 150 when the client device 150 is not yet subscribed to the first party portal service 100. Such information may include promotional images (i.e. thumbnails) and service configurations with client devices 150 that are not yet subscribed to the first party portal service 100.

It should be noted that subscriptions may or may not be needed with respect to different first party portal services. In some embodiments, subscriptions may require a periodic payment from the user in order to access services associated with the first party portal service. In other embodiments, subscriptions may not require payment but may instead require an authenticated user account associated with the first party portal service. In a further embodiment, users may be provided different sets of features/benefits based on the type of subscription. For example, having an authenticated user account may provide a first set of benefits while payment of a subscription fee may provide a second set of benefits in addition to the first set of benefits. There may be embodiments where there are different types of subscription fees (e.g., silver, gold level subscriptions) and different benefits associated with payment of the different type of subscription fees.

The Content Provider Server API 120 can also be accessed by a backend service layer 140. As illustrated in the figure, the first party portal service 100 includes the back end service 140 that facilitates carrying out the first party portal services for the client device 150. The backend service 140 is responsible for communicating with the different content sources 110 (via corresponding Content Provider Server APIs 120) that have available content for the user to view on the client device 150. The backend service 140 can also perform processes to have that content available (e.g., retrieval, formatting) to the user on the client device 150. The backend service 140 could carry out instructions, for example, that would facilitate identifying formats of the content and subsequently formatting the content from these different content sources 110 so that the content is usable by the client device 150. The instructions may include extracting metadata associated with each of the content then using various different types of conversion techniques so that data stored in one format with respect to the content sources 110 can be rendered and displayed on the client devices 150, which may correspond to a second format.

As described above, the backend service layer 140 is capable of accessing the Content Provider Server API 120 in order to obtain additional information about available content for the client device 150. Additional information, such as metadata, can be usable to provide details about the content being shown to the user.

The backend service layer 140 is also capable of implementing additional functionalities associated with the various content sources 110. For example, information regarding chat services, ratings and profiles can be provided from the video content sources 110 to the client device 150 via the Content Provider Server API 120. The backend service layer 140 would carry out the instructions from the Content Provider Server API 120 used to implement the information related to chat services, ratings and profiles so that they appear on the client device 150.

The first party portal service 100 is compatible with any number of different client devices 150. The client device 150 (i.e. the user device) can include a plurality of different computing devices. For example, the client device 150 may include any number of different gaming consoles, mobile devices, laptops, and desktops. These client devices 150 may also run using a variety of different operating systems (e.g., iOS, Android), applications or computing languages (e.g., C++, JavaScript). The first party portal service 100 may facilitate communication between similar types of client devices 150 as well as between different types of client devices 150. Details regarding exemplary client devices 150 have been provided below with respect to FIG. 2.

Each of the client devices 150 may already know how to perform various processes used to retrieve, format, rank and/or display the content for the user to view as described herein. In some embodiments, the first party portal service may provide the necessary instructions (via downloadable updates) that can be used by the client devices 150 to carry out the various processes used to retrieve, format, rank and/or display the content for the user to view as described herein. In another embodiment, the client devices 150 may also be able to download (or in some other way receive) an application that includes the necessary instructions/processes to retrieve, format, rank or display the content. Execution of the application would allow the client device 150 to carry out the retrieval, formatting, ranking or displaying of the content as described herein.

Figure 2:
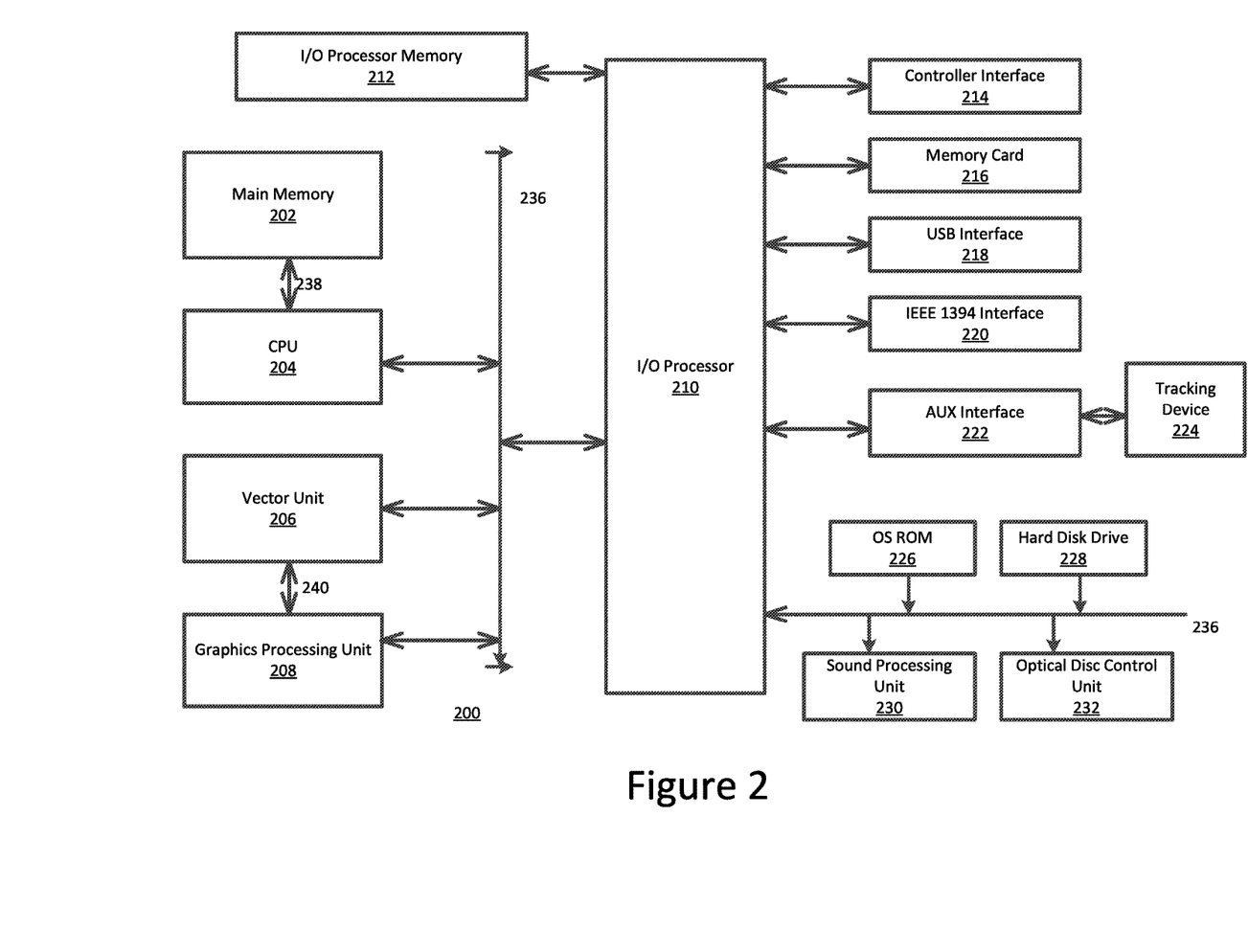
FIG. 2 is an exemplary user device having the first party portal.

FIG. 2 is an exemplary user device (i.e. client device as illustrated in FIG. 1) having the first party portal 200. The exemplary user device 200 (e.g., desktop, laptop, tablet, mobile device, console gaming system) is a device that the user can utilize to facilitate carrying out features of the present invention pertaining to the viewing of third party content.

The user device having the first party portal 200 may include various elements as illustrated in FIG. 2. It should be noted that the elements are exemplary and that other embodiments may incorporate more or less than the elements illustrated. With reference to FIG. 2, the user device having the first party portal 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The user device having the first party portal 200 further includes an operating system read-only memory (OS ROM) 226, a sound processing unit 228, an optical disc control unit 230, and a hard disc drive 232, which are connected via a bus 234 to the I/O processor 210. The user device having the first party portal 200 further includes at least one tracking device 224.

The tracking device 224 may be a camera, which includes eye-tracking capabilities. The camera may be integrated into or attached as a peripheral device to user device having the first party portal 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user device having the first party portal 200 that captures voice data. The microphone may conduct acoustic source localization and/or ambient noise suppression.

Alternatively, tracking device 224 may be the controller of the user device having the first party portal 200. The controller may use a combination of built-in accelerometers and infrared detection to sense its position in 3D space when pointed at the LEDs in a sensor nearby, attached to, or integrated into the console of the entertainment system. This design allows users to control functionalities of the user device having the first party portal 200 with physical gestures as well as button-presses. The controller connects to the user device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device having the first party portal 200 may be an electronic gaming console. Alternatively, the user device having the first party portal 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user device 200 provides instructions via the controller interface 214 to the CPU 204. For example, the user may instruct the CPU 204 to store certain information on the memory card 216 or instruct the user device 200 to perform some specified action.

Other devices may be connected to the user device 200 via the USB interface 218, the IEEE 1394 interface 220, and the AUX interface 222. Specifically, a tracking device 224, including a camera or a sensor may be connected to the user device having the first party portal 200 via the AUX interface 222, while a controller may be connected via the USB interface 218.

Figure 3:
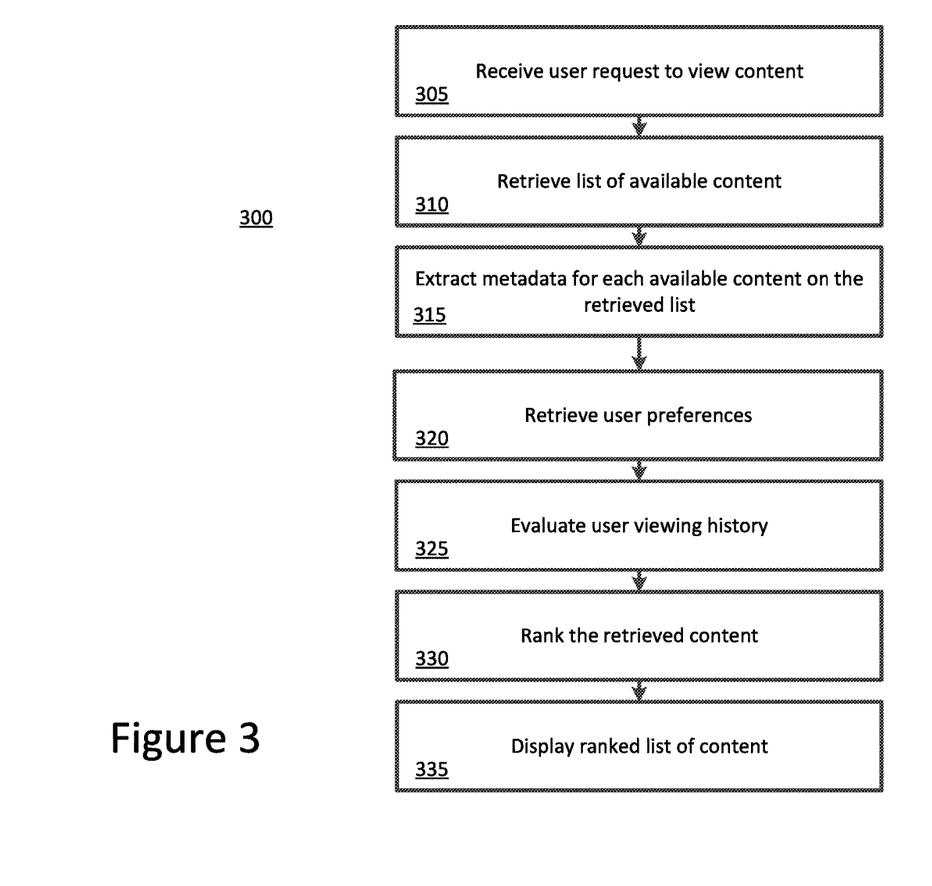
FIG. 3 illustrates an exemplary method for delivering customized content to the user.

FIG. 3 illustrates an exemplary method 300 for delivering customized content to the user. The customized content may be delivered, for example, as a list displayed on the client device. In an embodiment of the present disclosure, the customized content corresponds to a list of content (e.g., shows, movies) that the user would be interested in watching. This list is customized because it is based on each user's personal preference (e.g., favorite shows) as well as viewing history (e.g., what content the user previously watched). In some embodiments, the list may include the titles of the content. It is also possible to include images (e.g., thumbnails) associated with the content. Since there is such a vast array of different types of content to sift through from a variety of different content providers, the first party portal service circumvents the time and effort that the users may need to spend in order to obtain content that they would like to view.

In step 305, a user request to view content may be provided from the client device to the first party portal service. This user request can be provided via a user interface (e.g., search engine, text box) associated with the client device. These user requests can be saved for future reference.

For example, the user may provide a type of content they would like to view using one or more descriptions (e.g., genre). The user may also indicate other various conditions for displaying the list of customized content for the user such as limiting a number of entries to be displayed or dictating how the list should be displayed (e.g., text-only, images-only, hybrid). The user may also be able to use previous saved search requests saved in memory thereby updating previous searches with newer content since the last time the previous search was performed. In some embodiments, the first party portal service (or the client computing device) may use the previously saved search report to automatically update the displayed list of content for the user to view on a regular basis (e.g., hourly, daily, weekly).

In some embodiments, the user view request can be resolved at the client device itself. For example, the first party portal service may provide information to the client device used to rank content at a previous time (e.g., during initiation of the client device) or may provide such information about available content on a regular basis to the user device. Using the information from the first party portal service, the client device can process the user request to rank and view content if the information is available on the client device.

In step 310, the first party portal service retrieves a list of all available content on the network for ranking with respect to the user request. In an embodiment, the first party portal service may be instructed retrieve less than all the available content (i.e. a subset) from all available sources on the network. For example, a user may direct the first party portal service to only retrieve/rank content only from a selection of pre-identified sources. The user may also identify and select particular sources from which content can be obtained based on various characteristics, for example, a genre. For example, if a user is only interested in viewing recent updates on comedy shows, the user can identify comedy-related content as a genre of content that the user is interested in. In this way, when the first party portal service seeks to retrieve available content, particular sources specific to comedy (instead of all available sources) may be specifically queried to determine what comedy-related content is available for the user to view.

The content that is retrieved by the first party portal service will be used to rank the content in an order for the user that the user is more likely to view. The ranking is based, for example, on the user preference and viewing history by. The ranking is performed by comparing information (e.g., metadata) associated with the retrieved content with information about the user (e.g., user preference, viewing history).

In some embodiments, additional factors may also influence the ranking process of the retrieved content. Some embodiments may provide a weight that can be used to modify the ranking of one or more content so that the content affected be the weights could be ranked higher or lower than compared to if no weight is used. For example, in one embodiment, a first weight can be provided that improves the likelihood of applicable content to be ranked higher with respect to other content for the user to view. Users may wish to utilize the first weight for newer content (e.g., new episode in a series) to ensure that the user views more recent content. The user may also wish to utilize the first weight for expiring content (e.g., content that has been marked for removal from a content source) in order to ensure that the user is able to view the content before it becomes unavailable.

It should be noted that a different set of weights can also be implemented that reduces the ranking of content with respect to other content. These second weights may be associated with content that the user has favorited (i.e. indicated that they would like to view) but has not viewed recently (e.g., within the last month). The second weights can be implemented to facilitate distinguishing between preferred user content. For example, if a user favorited two different television series, the one series that has not been followed recently (or on a regular basis) may be ranked lower than the television series that the user views on a regular basis.

With respect to the first and second types of weights, there may be different varying degrees. The conditions for assigning the different first and second types of weights as well as the varying degrees of the first and second types of weights can be customized by the first party portal service and/or the user.

In step 315, the metadata for each retrieved content is extracted. The extracted metadata may include information about the content such as the title, genre, run-time, actors, if the content is part of a series, etc. . . . . The extracted metadata may be used to rank the content as described above.

In one scenario, the user's preference may indicate that the user enjoys romantic comedies. Therefore, the metadata associated to the retrieved content can be used to identify from all available content a subset of content that falls under the genre of being a romantic comedy. In this way, such content can be ranked higher based on this user's preference. In another scenario, a user's preference can similarly indicate preference of a particular series (e.g., Family Guy) or a particular actor. The extracted metadata associated with the retrieved content can be used to identify content that includes elements (e.g., actors) that coincide with the user's preference and rank these shows higher than other shows.

In step 320, user preference information is retrieved. As noted above, a user may include a plurality of different descriptions that can be used to rank content according to the user's preference. The different descriptions may be provided via a user interface associated with the client device. These descriptions could then be forwarded to the first party portal service for use in ranking content. In other embodiments, the descriptions may be used by the client device directly in order to rank content for customized user viewing.

In one embodiment, a user could identify a preferred type of content (e.g., genre) that the user would like to view. In other embodiments, the user can identify other features such as actors or whether the content is part of a particular series of content. The user's preference may also include descriptions favoring content that is new or recent (i.e. within the last two weeks). It should be noted that there may be any number of different descriptions that users could identify and distinguish the types of content the user would like to view. The user may also provide different types of weights of varying degrees so that preferred content can be further ranked. For example, if the user prefers romantic comedies and action movies but would prefer to watch one over the other, the user could provide corresponding weights so that both content can appear on the customized list but may have one content generally ranked higher than the other.

Content that could coincide with at least one of the descriptions associated with the user's preference may be ranked higher than other content that does not coincide with any of the descriptions associated with the user's preference. Furthermore, content that coincides with multiple descriptions associated with the user's preference may be ranked higher than content that has fewer descriptions that coincide with the user's preference.

In step 325, user viewing history is evaluated. In some embodiments, the user's viewing history can be used to further rank the retrieved content. Similar content that has been recently viewed can be provided a corresponding weight that would rank such content higher on a list presented to the user for viewing. Similarly, content that has not been viewed within a particular time period can be provided a weight that could rank such content lower on a list presented to the user for viewing. In some embodiments, the weight for content that has not been viewed within a particular time period can be a decaying weight that modifies as more time passes. In other words, this weight can be further adjusted as time passes and the content has not been viewed within pre-determined thresholds (e.g., two weeks, one month, three months, one year). In this way, content that is more recently viewed can be provided a higher weight than content that has not been viewed recently.

In another embodiment, weights can also be provided to content based on frequency of a user's viewing. In some situations, users may view content belonging to a particular series on a frequent basis (e.g., daily, weekly). In other situations, users may view the same content multiple times. If the received content corresponds to a series of content, the user frequency can impact weights for newer content belonging to that series. If the user views a particular content multiple times (e.g., watches the same television episode three times), this can also provide a corresponding weight to the next episode in that same series so that the first party portal ranks the new episode higher up on the list. The frequency can also be used to impact related content (via associated weights), for example, content that shares descriptions/characteristics such as genre and actors.

Weights can also be provided to content based on a duration of a user's viewing of related content. Duration of a user's viewing session of a related content can be used to determine whether a user is interested in the content that was viewed. In some situations, users who view less than an entire content (e.g., fast forward) may be less interested in the viewed content compared to content that is viewed in its entirety. The duration of user viewing can be translated into weights used to rank content higher or lower. If a user only browses a portion of a content, this may be provided a lesser weight that could impact related content to be ranked lower than content that the user has viewed entirely.

In step 330, ranking the retrieved list of all available content based on the user preference information and user viewing history is performed. As noted above, the ranking is based on the metadata extracted from each of the available content and compared against the user preference and user viewing history. Each content is provided one or more weights on any number of different descriptions or criteria that would help distinguish that content from other content (e.g., ranked higher/lower). For example, frequency and duration of views can be used to influence weights associated with the content. Furthermore, whether content matches one or more descriptions associated with the user preference can also impact the weights used to rank the associated content. It should be noted that other conditions for providing weights not described herein would also be usable to help further distinguish the content so that ranking can be performed more effectively for each user.

The ranking itself is performed using one or more different types of formulas. These formulas take into account the user preference information and assigned weights in order to generate a list of content that the user would like to view. The list may initially be generated to include a pre-determined number of items (e.g., list of the top 25 content) although more or less items may be requested.

In some situations, based on the size of the list that is being requested, conditions and/or weights can be modified in order to better distinguish between all available content that could now potentially have similar ranking. For example, in situations where fewer entries are displayed for the user, the user may indicate to the first party portal service that the frequency of views may be significant. In doing so, the first party portal service can provide a greater weight to newer content so that the small list may include more recent content compared to situations where more entries are displayed for the user that may include content that is both recent and not as recent.

The user, in another embodiment, may also specify whether they would prefer new or older content. Although this descriptor can be used, for example, as a user preference and therefore applicable during ranking of content generally, this descriptor can also be used to modify or add additional weights to the available content in a similar manner described above in order to further distinguish similarly ranked content where fewer entries can be displayed.

In step 335, the ranked list of content is provided to the user. Once the ranking of the available content is completed, the first party portal service can transmit the ranked list of content for the user to view. The list of content may be displayed, via an interface, associated with the client device. The user may be able to directly interact with entries on the displayed list in order to view the content directly on the client device.

It should be noted that although the ranking can be performed on all available content based on user preference and viewing history, a subset of content can also be ranked based on user input (e.g., user preference). In fact, the subset of content may be identifiable using the user preference information provided by the user. For example, users may specify particular video content sources or particular time frames of available content should be ranked. In doing so, the ranking may be more efficient (i.e. less content that needs to be processed and ranked) and more effective (i.e. more relevant content will be processed and ranked).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for displaying user specific content on a user device, the method comprising:
   receiving a request from a user computing device, wherein the request is for a customized list of content;
   executing instructions stored in memory, wherein execution of the instructions by a processor:
      retrieves information regarding available content from a plurality of different content sources based on the request,
      extracts metadata for each available content from the retrieved information, wherein the extracted metadata includes characteristics about each available content,
      retrieves user preferences that identify one or more preferred characteristics, wherein the preferred characteristics are associated with one or more customizable weights,
      generates a ranked list of the available content from the plurality of different content sources based on comparing the characteristics of each available content to the preferred characteristics as weighted by the customizable weights,
      updates the ranked list based on user viewing history of frequently and recently viewed content, wherein the frequently and recently viewed content are ranked in the ranked list based on a comparison of characteristics of the frequently and recently viewed content to the preferred characteristics as weighted by the customizable weights, and
      generates source-specific instructions based on the extracted metadata for each available content on the updated ranked list, the source-specific instructions executable to retrieve the available content from a respective content source and to format the retrieved content for rendering on the user computing device; and
   providing the updated ranked list of the available content to the user computing device, wherein selected content is retrieved from an identified one of the content sources and formatted for rendering on the user computing device in accordance with the source-specific instructions associated with the one identified content source.

2. The method of claim 1, wherein the recently viewed content according to the user viewing history of content is associated with a first weight, and wherein ranking the list based on the first weight comprises ranking the recently viewed content higher than content that is viewed less recently.

3. The method of claim 1, wherein the frequently viewed content according to the user viewing history is associated with a first weight, and wherein ranking the list based on the first weight comprises ranking the frequently viewed content higher than content that is viewed less frequently.

4. The method of claim 1, wherein the user preferences include one or more conditions used to identify what subset of the available content should be ranked.

5. The method of claim 1, wherein retrieving the information regarding available content includes updating a stored list on the user computing device with new content that was not previously retrieved.

6. The method of claim 1, further comprising receiving additional user preferences that identifies a subset of all information regarding available content to be retrieved.

7. The method of claim 1, further comprising storing the user request into memory, wherein the stored user request is used to further update the updated ranked list of the available content.

8. The method of claim 1, wherein the updated ranked list of the available content is automatically updated on a regular basis using the last user request.

9. The method of claim 1, wherein the one or more weights include a second weight that ranks newer content higher than other content.

10. The method of claim 1, wherein the ranked list is updated dynamically as new content becomes available from one or more of the different content sources.

11. The method of claim 1, wherein the ranked list is updated dynamically as one or more of the user preferences change.

12. The method of claim 1, further comprising adjusting the weights based on user frequency.

13. The method of claim 1, further comprising adjusting the weights based on repeated views.

14. The method of claim 1, further comprising adjusting the weights based on a duration of viewing.

15. A system for displaying user specific content lists on a user device, the system comprising:
   a user computing device that receives a request from a user, wherein the request is for a customized list of content; and
   a server associated with a first party portal service, wherein the server includes instructions executable by a processor to:
      retrieve information regarding available content from a plurality of different content sources based on the request,
      extract metadata for each available content from the retrieved information, wherein the extracted metadata includes characteristics about each available content,
      retrieve user preferences that identify one or more preferred characteristics, wherein the preferred characteristics are associated with one or more customizable weights,
      generate a ranked list of the available content from the plurality of different content sources based on comparing the characteristics of each available content to the preferred characteristics as weighted by the customizable weights,
      update the ranked list based on user viewing history of frequently and recently viewed content, wherein the frequently and recently viewed content are ranked in the ranked list based on a comparison of characteristics of the frequently and recently viewed content to the preferred characteristics as weighted by the customizable weights,
      generate source-specific instructions based on the extracted metadata, the source-specific instructions executable to retrieve the available content from a respective content source and to format the retrieved content for rendering on the user computing device; and
      provide the updated ranked list of the available content to the user computing device, wherein selected content is retrieved from an identified one of the content sources and formatted for rendering on the user computing device in accordance with the source-specific instructions associated with the one identified content source.

16. The system of claim 15, wherein the viewing history is used to modify how the available content is ranked using the one or more weights.

17. The system of claim 15, wherein the user preferences include one or more conditions used to identify what subset of the available content should be ranked.

18. The system of claim 15, wherein the server further receives additional user preferences that identifies a subset of all information regarding the available content to be retrieved.

19. The system of claim 15, wherein the updated ranked list of the available content is automatically updated on a regular basis using the last user request.

20. A non-transitory computer-readable storage medium, having embodied thereon a program executable by a processor to perform a method for displaying user specific content lists on a user device, the method comprising:

receiving a request from a user computing device, wherein the request is for a customized list of content;

retrieving information regarding available content from a plurality of different content sources based on the request;

extracting metadata for each available content from the retrieved information, wherein the extracted metadata includes characteristics about each available content;

retrieving user preferences that identify one or more preferred characteristics, wherein the preferred characteristics are associated with one or more customizable weights;

generating a ranked list of the available content from the plurality of different content sources based on comparing the characteristics of each available content to the preferred characteristics as weighted by the customizable weights;

updating the ranked list based on user viewing history of frequently and recently viewed content, wherein the frequently and recently viewed content are ranked in the ranked list based on a comparison of characteristics of the frequently and recently viewed content to the preferred characteristics as weighted by the customizable weights;

generating source-specific instructions based on the extracted metadata for each available content on the updated ranked list, the source-specific instructions executable to retrieve the available content from a respective content source and to format the retrieved available content for rendering on the user computing device; and providing the updated ranked list of the available content to the user computing device, wherein a selected available content is retrieved from one identified content source of the plurality of different content sources and formatted for rendering on the user computing device in accordance with the source-specific instructions associated with the one identified content source.

* * * * *